United States Patent [19]
Kioka et al.

[11] Patent Number: 5,091,353
[45] Date of Patent: Feb. 25, 1992

[54] PROCESS FOR PRODUCING ETHYLENE COPOLYMER

[75] Inventors: Mamoru Kioka, Ohtake; Norio Kashiwa, Twakuni, both of Japan

[73] Assignee: Mitsui Petrochemical Industries, Ltd., Tokyo, Japan

[21] Appl. No.: 423,586

[22] Filed: Oct. 17, 1989

Related U.S. Application Data

[60] Division of Ser. No. 198,641, May 26, 1988, abandoned, which is a continuation of Ser. No. 82,913, Aug. 10, 1987, abandoned, which is a continuation of Ser. No. 801,697, filed as PCT/JP85/00131, Mar. 15, 1985, abandoned.

[30] Foreign Application Priority Data

Mar. 16, 1984 [JP] Japan .................................. 59-49205

[51] Int. Cl.$^5$ ...................... C08F 4/654; C08F 4/655; C08F 210/02
[52] U.S. Cl. .................................... 502/111; 502/104; 502/125; 502/133; 502/134; 526/124; 526/125; 526/348; 526/348.4; 526/348.6; 526/909
[58] Field of Search ................ 526/124, 125; 502/104, 502/111

[56] References Cited

U.S. PATENT DOCUMENTS

| | | | |
|---|---|---|---|
| 4,071,674 | 1/1978 | Kashiwa et al. | 526/125 |
| 4,205,021 | 5/1980 | Morita et al. | 526/125 |
| 4,298,713 | 11/1981 | Morita et al. | 526/125 |
| 4,438,243 | 3/1984 | Kashiwa et al. | 526/125 |
| 4,526,943 | 7/1985 | Fuentes et al. | 526/142 |

FOREIGN PATENT DOCUMENTS

| | | | |
|---|---|---|---|
| 52464 | 5/1982 | European Pat. Off. | 526/125 |
| 109779 | 5/1984 | European Pat. Off. | 526/125 |
| 3202961 | 8/1983 | Fed. Rep. of Germany | 526/125 |
| 1485520 | 9/1977 | United Kingdom | 526/125 |

Primary Examiner—Edward J. Smith
Attorney, Agent, or Firm—Sherman & Shalloway

[57] ABSTRACT

An improved process for producing an ethylene copolymer composed of a major proportion of ethylene and a minor proportion of an alpha-olefin having 3 to 10 carbon atoms and having a density of 0.910 to 0.945 g/cm$^3$ and an ethylene content of 85 to 99.5 mole %. The use of a titanium catalyst component (A) which meets a parametric combination of specific requirements is essential in this process. The process can industrially advantageously give a low to medium density ethylene copolymer of high quality with high productivity while advantageously circumventing the operational troubles which have been difficult to avoid by conventional processes.

13 Claims, No Drawings

PROCESS FOR PRODUCING ETHYLENE COPOLYMER

This application is a division of application Ser. No. 07/198,641, filed May 26, 1988, which is a continuation of Ser. No. 07/082,913, filed Aug. 10, 1987, which is a continuation of Ser. No. 06/801,697, filed as PCT/JP85/00131, Mar. 15, 1985, all now abandoned.

TECHNICAL FIELD

This invention relates to a process for producing an ethylene copolymer having a density of 0.910 to 0.945 g/cm$^3$ from a major proportion of ethylene and a minor proportion of an alpha-olefin having 3 to 10 carbon atoms using a catalyst essentially comprising a specific titanium catalyst component. It is an improved process by which a low to medium density ethylene copolymer having high quality can be produced industrially advantageously with high catalytic activity and high productivity per polymerization vessel by an industrially easy operation.

BACKGROUND TECHNOLOGY

It is known that copolymerization of ethylene with a minor proportion of an alpha-olefin with a Ziegler catalyst gives an ethylene copolymer having the same density as high-pressure polyethylene. Generally, it is advantageous to employ a high-temperature solution-polymerization process in which the polymerization is carried out by using a hydrocarbon solvent at a temperature above the melting point of the resulting copolymer because the polymerization operation is easy. However, attempts to obtain a polymer having a sufficiently high molecular weight result in higher viscosities of the polymer solution, and the polymer concentration in the polymer solution should be lowered. Accordingly, the process has the defect that the productivity of the copolymer production per polymerization vessel necessarily becomes low.

On the other hand, when it is desired to obtain the aforesaid low-density ethylene copolymer using known catalysts by the slurry polymerization method frequently used in the production of high-density polyethylene, the copolymer is frequently liable to dissolve or swell in the polymer solution, resulting in the rise of the viscosity of the polymer solution, the adhesion of the polymer to the polymerization vessel walls and the decrease of the bulk density of the polymer. Accordingly, this method has the defect that the slurry concentration cannot be increased, and it cannot be operated continuously for a long period of time. Furthermore, the resulting copolymer becomes sticky, and its quality is affected.

It has been found that the aforesaid technical defects or troubles are especially serious in the production of low to medium density ethylene copolymers from a major proportion of ethylene and a minor proportion of an alpha-olefin having 3 to 10 carbon atoms.

Investigations of the present inventors have shown that the aforesaid technical defects or troubles are especially great in the production of ethylene copolymers having a density of 0.910 to 0.945 g/cm$^3$ of ethylene as a main component and a minor amount of an alpha-olefin having 3 to 10 carbon atoms as a comonomer which can give film products having excellent transparency and heat-sealing property.

Investigations of the present inventors have shown that in the production of the above ethylene copolymers by the slurry polymerization method, the resulting solid polymer is liable to swell in the reaction solvent and to assume an irregular shape far from a desirable shape such as a sphere or the like, and therefore if the concentration of the polymer in the polymerization system is increased, the polymerization system assumes a porridge-like slurry which makes it difficult to perform a polymerization operation permitting uniform polymerization It has further been found that it is impossible to avoid the formation of a substantial amount of an ethylene copolymer easily soluble in hydrocarbon solvents, which is indicated, for example, as the proportion of the hexane-soluble portion in Examples and Comparative Examples given hereinafter, and consequently the viscosity of the copolymer solution increases unduly. These technical defects attributed to the poor slurry properties during the polymerization have been found to be difficult to circumvent.

Thus, because of the poor slurry properties during slurry polymerization for the production of the specific ethylene, the slurry concentration of the copolymerization system cannot be increased, and therefore, the desired ethylene copolymer cannot be produced with high productivity. Furthermore, increasing the slurry concentration of the copolymerization system causes various troubles such as an abrupt reduction in stirring efficiency, blockage of pipes for conveying the slurry, the reduced efficiency of separating the copolymer from the reaction solvent in a decanter, and the increased load of energy required to dry the separated copolymer.

When a vapor-phase polymerization method is used instead of the slurry polymerization method, it is likewise impossible to avoid the formation of a substantial amount of an ethylene copolymer easily soluble in hydrocarbon solvents. Moreover, since the ethylene polymer shows undesirable tackiness in the vapor phase copolymerization system, the copolymer particles are agglomerated in the vapor-phase polymerization reaction zone, and a stable fluidized bed becomes difficult to form. Furthermore, it is difficult to circumvent blockage of that part of the polymerization vessel which is near a port for withdrawing the resulting ethylene copolymer.

No proposal has yet been known of using the titanium catalyst component specified in the process of this invention with a view to overcoming the aforesaid technical defects or troubles which constitute an especially important technical problem in the production of an ethylene copolymer having a density of 0.910 to 0.945 g/cm$^3$ and composed of a major proportion of ethylene and a minor proportion of alpha-olefin having 3 to 10 carbon atoms.

Some prior proposals are known of polymerizing or copolymerizing olefins in the presence of a catalyst composed of a titanium catalyst component, which is the reaction product of a hydrocarbon solvent-insoluble magnesium/aluminum solid complex derived from a liquid magnesium compound and an compound, and an organoaluminum compound catalyst component. However, no proposal has been known of overcoming the aforesaid technical defects or troubles in the production of the above-specified ethylene copolymer.

For example, Japanese Laid-Open Patent Publication No. 11908/1981 (corresponding to European Laid-Open Patent Publication No. 22675) proposes a process for polymerizing or copolymerizing olefins in the presence of a catalyst which can embrace the aforesaid catalyst composed of the titanium catalyst component and the organoaluminum compound catalyst component. This proposal, however, does not at all refer to the presence of the aforesaid technical problem in the production of the specific ethylene copolymer and its solution. All of the working examples given in this patent document are directed to the polymerization of propylene. Naturally, therefore, this patent publication neither describes nor suggests the parametric combination of the requirements (i) to (iv) of this invention to be described in detail hereinafter. It neither gives a specific disclosure of any one of these requirements. In particular, as regards the requirement (iii), the above patent document states that the Ti/Mg (atomic ratio) is at least 1, usually about 5 to about 200, especially about 10 to about 100. As will be shown by Comparative Example 5, the use of the Ti/Mg atomic ratio which does not meet the requirement (iii) cannot achieve the unexpected and excellent improving effect by the process of this invention.

Japanese Laid-Open Patent Publication No. 189206/1983 (corresponding to European Laid-Open Patent Publication No. 93494) also proposes a process which comprises polymerizing or copolymerizing olefins in the presence of a catalyst which can embrace the catalyst composed of a titanium catalyst component, which is the reaction product of a hydrocarbon solvent-insoluble magnesium/aluminum solid complex derived from a liquid magnesium compound and an organoaluminum compound, and an organoaluminum compound catalyst component. This patent document neither refers to the presence of the aforesaid technical problem in the production of the aforesaid specific ethylene copolymer and its solution. All of the working examples in this patent document are directed to homopolymerization of ethylene/propylene or butene-1. In this proposal, too, it is natural that no specific disclosure is made of the parametric combination of the requirements (i) to (iv) of the present invention or of any of these requirements individually.

It is an object of this invention therefore to provide a process for producing an ethylene copolymer having a low to medium density and composed of a major proportion of ethylene and a minor proportion of an alpha-olefin having 3 to 10 carbon atoms, which can overcome the aforesaid technical problem in the production of low to medium density ethylene copolymers.

DISCLOSURE OF THE INVENTION

This invention is a process for producing an ethylene copolymer comprising a major proportion of ethylene and a minor proportion of an alpha-olefin which comprises copolymerizing ethylene with at least one alpha-olefin having 3 to 10 carbon atoms in the presence of a catalyst composed of (A) a titanium catalyst component which is the reaction product of (A-1) a hydrocarbon solvent insoluble magnesium/aluminum solid complex derived from a liquid magnesium compound and an organoaluminum compound, with (A-2) a tetravalent titanium catalyst compound, and (B) an organoaluminum compound catalyst component; wherein (i) the titanium catalyst component (A) contains 10 to 100%, based on the entire Ti in the component, of Ti of a lower valency state than a valence of 4, (ii) the solid complex (A-1) contains 0.01 to 0.5 g-equivalent, per Mg atom, of a hydrocarbon group $R^2$ having reducibility and 0.5 to 15 parts by weight, per part by weight of Mg, of an organic group $OR^1$ where $R^1$ represents a hydrocarbon group) having no reducibility, (iii) the titanium catalyst component (A) is a reaction product obtained by reacting the solid complex (A-1) and the tetravalent titanium compound (A-2) under such conditions that the Ti/Mg atomic ratio of (A-1) and (A-2) is from 0.01 to 0.6, and (iv) the resulting ethylene copolymer has an ethylene content of 85 to 99.5 mole % and a density of 0.910 to 0.945 $g/cm^3$.

Investigations of the present inventors have shown that by satisfying the parametric combination of the requirements (i) to (iv), there can be provided an improved process by which the technical problem stated in detail in the section of "Background Technology" can be overcome industrially advantageously, it is possible to circumvent the operational troubles which are attributed to the increased formation of a hydrocarbon-soluble copolymer shown in Examples and Comparative Examples given below as the hexane-soluble portion and the worsened characteristics of the resulting polymer particles and which have been difficult heretofore to avoid, a copolymer having a narrow composition distribution can be produced, and a low to medium ethylene copolymer of high quality capable of being formed into films and other articles having excellent transparency, antiblocking property and heat sealing property can be produced advantageously on an industrial scale with high catalytic activity and high productivity per polymerization vessel by an industrially easy operation.

The process of this invention has also been found to have the advantage that in a process, such as vapor-phase polymerization, in which all of the resulting copolymer becomes a product, such excellent molded articles can be obtained, and during catalyst preparation, the efficiency of utilizing the raw materials is high and the waste liquor can be easily treated.

In the process of this invention, an ethylene copolymer containing a major proportion of ethylene and a minor proportion of an alpha-olefin is produced by copolymerizing ethylene with at least one alpha-olefin having 3 to 10 carbon atoms, preferably 4 to 10 carbon atoms, in the presence of the catalyst composed of the titanium catalyst component (A) and the organoaluminum compound catalyst component (B) so that the requirements (i), (ii), (iii) and (iv) are satisfied in combination.

The liquid magnesium compound utilized in the formation of the titanium catalyst component (A) may, for example, be a solution of a magnesium compound in a hydrocarbon, an electron donor or a mixture of both, or a melt of a magnesium compound.

Examples of the magnesium compound include magnesium halides such as magnesium chloride, magnesium bromide, magnesium iodide and magnesium fluoride; alkoxy magnesium halides, preferably $C_1$-$C_{20}$ alkoxy magnesium halides, such as methoxy magnesium chloride, ethoxy magnesium chloride, isopropoxy magnesium chloride, butoxy magnesium chloride and octoxy magnesium chloride; aryloxy magnesium halides, preferably $C_6$-$C_{30}$ aryloxy magnesium halides, such as phenoxy magnesium chloride and methylphenoxy magnesium chloride; alkoxy magnesiums, preferably $C_1$-$C_{20}$ alkoxy magnesiums, such as ethoxy magnesium, isopropoxy magnesium, butoxy magnesium and octoxy magnesium; aryloxy magnesium, preferably $C_6$–$C_{30}$ aryloxy magnesiums, such as phenoxy magnesium and dimethylphenoxy magnesium; and magnesium salts of carboxylic acids such as magnesium laurate and magnesium stearate. These magnesium compounds may be in the form of complexes with other metals or mixtures with other metal compounds. Mixtures of two or more of these magnesium compounds may also be used.

Among the foregoing, preferred magnesium compounds are magnesium halides, alkoxy magnesium halides, aryloxy magnesium halides, alkoxy magnesiums and aryloxy magnesiums of the formula $MgX_2$, $Mg(OR^5)X$ and $Mg(OR^5)_2$ (wherein X is halogen, and $R^5$ is a hydrocarbon group such as an alkyl group or an aryl group optionally having a substituent such as a lower alkyl group). Examples of more preferred magnesium compounds include halogen-containing magnesium compounds such as magnesium chloride, alkoxy magnesium chlorides, particularly $C_1$–$C_{10}$ alkoxy magnesium chlorides, and aryloxy magnesium chlorides, especially $C_6$–$C_{20}$ aryloxy magnesium chlorides. Magnesium chloride is especially preferred.

Suitable liquid magnesium compounds are solutions of these magnesium compounds in hydrocarbon solvents, or electron donors or a mixture of both.

Examples of the hydrocarbon solvents used for this purpose are aliphatic hydrocarbons such as pentane, hexane, heptane, octane, decane, dodecane, tetradecane and kerosene; alicyclic hydrocarbons such as cyclopentane, methyl cyclopentane, cyclohexane, methyl cyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

Such a solution of a magnesium compound in a hydrocarbon solvent can be formed, for example, by simply mixing the two (using, for example, $Mg(OR^3)_2$ in which $R^3$ is a $C_6$–$C_{20}$ hydrocarbon); mixing the two and heating the mixture; or using an electron donor soluble in the magnesium compound, such as an alcohol, an aldehyde, an amine, a carboxylic acid or mixtures of these, or a mixture thereof with another electron donor, and as required, heating the mixture.

As one of the above embodiment, the case of dissolving a halogen-containing magnesium compound in a hydrocarbon solvent using an alcohol will be described. The alcohol may be used in an amount of at least 1 mole, preferably about 1 to about 20 moles, specially preferably about 1.5 to about 12 moles, per mole of the halogen-containing magnesium compound, although its amount may vary depending upon the type and amount of the hydrocarbon solvent, the type of the magnesium compound, etc. The alcohol can be used in the above-exemplified amounts when an aliphatic hydrocarbon and/or an alicyclic hydrocarbon is used. If an alcohol having at least 6 carbon atoms is used, the halogen-containing magnesium compound can be dissolved by using the alcohol in an amount of at least 1 mole, preferably at least 1.5 moles, per mole of the halogen-containing magnesium compound. Since a catalyst component having high activity can be obtained by using a lesser total amount of the alcohol, this embodiment is preferred. If only an alcohol having 5 or less carbon atoms is used, it must be used in a total amount of at least about 15 moles per mole of the halogen-containing magnesium compound, and the activity of the resulting catalyst is lower than that obtained in the former embodiment. Accordingly, the use of the former embodiment is preferred. On the other hand, when an aromatic hydrocarbon is used as the hydrocarbon solvent, the halogen-containing magnesium compound can be dissolved by using it in an amount of, for example, about 1 mole to about 20 moles, preferably about 1.5 to about 12 moles, irrespective of the type of the alcohol used.

Contacting of the halogen-containing magnesium compound with the alcohol is carried out preferably in a hydrocarbon medium. This contacting can be carried out at room temperature or a higher temperature. Temperatures of at least about 65° C., preferably about 80° to about 300° C., more preferably about 100° to about 200° C., and periods of about 15 minutes to about 5 hours, preferably about 30 minutes to about 2 hours, may be cited as examples although they may be properly selected according to the types of the magnesium compound and the catalyst.

Examples of the electron donors used to form the liquid magnesium compounds include alcohols having at least 6, preferably 6 to 20, carbon atoms, such as 2-methylpentanol, 2-ethylbutanol, n-heptanol, n-octanol, 2-ethylhexanol, decanol, dodecanol, tetradecyl alcohol, undecanol, oleyl alcohol and stearyl alcohol; alicyclic alcohols such as cyclohexanol and methylcyclohexanol; aromatic alcohols such as benzyl alcohol, methylbenzyl alcohol, isopropyl benzyl alcohol, alpha-methylbenzyl alcohol and alpha, alpha-dimethyl benzyl alcohol; and alkoxy-containing aliphatic alcohols such as n-butyl Cellosolve and 1-butoxy-2-propanol. Examples of other alcohols include alcohols having 5 or less carbon atoms such as methanol, ethanol, propanol, butanol, ethylene glycol and methyl carbitol.

The magnesium compound solution may be a solution in an electron donor. Examples of preferred electron donors used for this purpose include alcohols, amines, aldehydes and carboxylic acids, above all the alcohols. Examples of such alcohols may be the same as exemplified above with regard to the case of dissolving magnesium compounds in hydrocarbon solvents using electron donors. Preferably, they are alcohols having at least 6 carbon atoms.

Examples of the carboxylic acids used to form the liquid magnesium compound are organic carboxylic acids having at least 7 carbon atoms, preferably 7 to 20 carbon atoms, such as caprylic acid, 2-ethylhexanoic acid, undecylenic acid, undecanoic acid, nonylic acid and octanoic acid.

Examples of the aldehydes used to form the liquid magnesium compound are aldehydes having at 7 carbon atoms, preferably 7 to 18 carbon atoms, such as caprylic aldehyde, 2-ethylhexyl aldehyde, caprylaldehyde and undecylic aldehyde. Examples of the amines used to form the liquid magnesium compound are amines having at least 6 carbon atoms, preferably 6 to 15 carbon atoms, such as heptylamine, octylamine, nonylamine, decylamine, laurylamine, undecylamine and 2-ethylhexylamine.

Other examples of electron donors which can be used to form the liquid magnesium compounds are phenols, ketones, esters, ethers, amides, acid anhydrides, acid halides, nitriles and isocyanates.

The quantities of the compounds or the dissolving temperature used to produce these solutions are substantially the same as those used in dissolving the magnesium compound in a hydrocarbon solvent using an electron donor as described above.

Since high temperatures must generally be maintained, the use of a solution of the magnesium compound in a hydrocarbon makes it easier to prepare a catalyst of high performance.

Another examples of the magnesium compound in the liquid state is a melt of the magnesium compound. Typical examples include melts of complex of magnesium halides with electron donors such as those exemplified hereinabove. Preferred are melts of magnesium halide/alcohol complexes represented by $MgX_2 \cdot nR^1OH$ ($R^1$ is a hydrocarbon group, and n is a positive number).

In the present invention, the hydrocarbon solvent-insoluble magnesium/aluminum solid complex (A-1) is derived from the liquid magnesium compound which can be formed as described above and an organoaluminum compound. The solid complex (A-1) contains 0.01 to 0.5 g-equivalent, preferably 0.03 to 0.3 gram-equivalent, more preferably 0.05 to 0.2 gram-equivalent, per Mg g-atom, of a hydrocarbon group $R^2$ having reducibility, and 0.5 to 15 parts by weight, preferably 1 to 10 parts by weight, more preferably 2 to 6 parts by weight, of an organic group $OR^1$ (wherein $R^1$ represents a hydrocarbon group) having no reducibility.

The solid complex (A-1) contains Mg and Al attributed to the liquid magnesium compound and the organoaluminum compound from which it is derived. The Al/Mg atomic ratio in the solid complex (A-1) is preferably from 0.05 to 1, more preferably from 0.08 to 0.5, especially preferably from 0.12 to 0.3. Usually, the solid complex (A-1) contains halogen attributed to the liquid magnesium compound and the organoaluminum compound from which it is derived and a halogenating agent to be described below. The halogen/Mg atomic ratio in the solid complex (A-1) is preferably from 1 to 3, more preferably from 1.5 to 2.5. The solid complex (A-1) may further contain an electron donor or another compound attributed to the liquid magnesium compound and the organoaluminum compound from which it is derived.

The hydrocarbon solvent-insoluble magnesium-/aluminum solid complex (A-1) can be formed by contacting the liquid magnesium compound and the organoaluminum compound. The resulting complex (A-1) contains the hydrocarbon group $R^2$ having reducibility and the organic group $OR^1$ (wherein $R^1$ is a hydrocarbon group and may be the same as, or different from, $R^2$ having no reduciability in the amounts which satisfy the requirement (ii).

Examples of the hydrocarbon group $R^2$ having reducibility are linear or branched alkyl groups having 1 to 10 carbon atoms such as methyl, ethyl, propyl, butyl, hexyl and octyl, aryl groups having 6 to 10 carbon atoms such as phenyl and benzyl and unsaturated cyclic groups having 5 to 10 carbon atoms such as cyclopentadienyl group. Preferably, $R_1$ is an alkyl group having 1 to 10 carbon atoms, more preferably an alkyl group having 2 to 8 carbon atoms. Alkyl groups having 2 to 4 carbon atoms are especially preferred.

Examples of $R^1$ in the organic group $OR^1$ having no reducibility include linear or branched alkyl groups having 1 to 20 carbon atoms such as methyl, ethyl, propyl, butyl, hexyl, octyl, lauryl and stearyl, alkenyl groups having 6 to 20 carbon atoms such as hexenyl, octenyl, undecenyl and octadecenyl, aryl groups having 8 to 20 carbon atoms such as phenyl and benzyl, and unsaturated alkapolyenyl groups having 5 to 10 carbon atoms such as cyclopentadienyl. Of these, alkyl groups having 2 to 20 carbon atoms and aryl groups having 6 to 10 carbon atoms are preferred. More preferably, $R^1$ is an alkyl group having 4 to 18 carbon atoms. Branched alkyl groups having 6 to 12 carbon atoms are especially preferred.

The solid complex (A-1) can be formed by contacting the liquid magnesium compound with the organoaluminum compound in various embodiments. For example, it can be obtained by reacting a solution containing the above-exemplified $MgX_2$ and the alcohol, preferably further containing a hydrocarbon, with an alkyl aluminum compound, or by reacting a solution containing the above-exemplified $Mg(OR^5)X$ or $Mg(OR^5)_2$ and the alcohol, preferably further containing a hydrocarbon, or a hydrocarbon solution of $Mg(OR^5)_2$ with an alkyl aluminum halide.

Examples of the alkyl aluminum compound include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}{}^3Al(OR^4)_{0.5}$ (wherein $R^3$ and $R^4$ represents a hydrocarbon group); dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; alkyl aluminum dihydrides such as ethyl aluminum dihydride and propyl aluminum dihydride; and partially alkoxylated and halogenated alkyl aluminums such as ethyl aluminum ethoxy chloride, butyl aluminum butoxy chloride and ethyl aluminum ethoxy bromide.

The alkyl aluminum halide may be selected from the above-exemplified halogen-containing alkyl aluminum compounds.

Contacting of the liquid magnesium compound with the organoaluminum compound may be effected in one step or multiple steps. For example, the multistep contacting may be carried out by causing the alkyl aluminum compound with the liquid magnesium compound to form a solid magnesium compound and contacting the resulting solid magnesium compound with the same or different alkyl aluminum compound as or from that used in the first step. Usually, the multistep contacting permits easier adjustment of the particle diameter of the magnesium compound, the amount of the organic groups, etc. and is easier to give a catalyst of high performance.

Desirably, the composition of the solid magnesium-aluminum complex is finally adjusted within the aforesaid range. For this purpose, it is preferred to select the amount of the alkyl aluminum in the above contacting properly. For example, the method of contacting the magnesium compound with the alkyl aluminum compound in two steps will be described. When a solution of the magnesium compound in the alcohol is used as the liquid magnesium compound, it is preferred to use the alkyl aluminum compound in such a proportion that after the second-step contacting, there are at least 0.5 equivalent of bonds between the alkyl groups and aluminum atoms in the alkyl aluminum compound per equivalent of the hydroxyl group of the alcohol. If the amount of the alkyl aluminum compound is too large, the shape of the resulting particles is worsened and a granular catalyst sometimes cannot be obtained. For this reason, it is usually preferred to use the alkyl aluminum compound in such a proportion that the amount of bonds between alkyl groups and aluminum atoms is 0.5 to 10 equivalents, preferably 0.7 to 5 equivalents, more preferably 0.9 to 3 equivalents, especially preferably 1.0 to 2 equivalents, per equivalent of the hydroxyl group of the alcohol.

The use of a trialkyl aluminum as the alkyl aluminum compound at this time is preferred because it permits easy preparation of a catalyst having a good shape. Other preferred organoaluminum compounds include dialkyl aluminum halides, dialkyl aluminum hydrides and dialkyl aluminum alkoxides.

In contacting the liquid magnesium compound with the alkyl aluminum compound, the concentration of the magnesium compound in the liquid product is preferably about 0.005 to 2 moles/liter, especially about 0.05 to 1 mole/liter.

Precipitation of the magnesium compound occurs as a result of the reaction of the alkyl aluminum compound with the alcohol to form an insoluble magnesium compound. When the precipitation of the magnesium compound is effected abruptly, it is sometimes difficult to obtain particles having an excellent shape, a moderate particle diameter and a narrow particle size distribution, and the resulting particles cannot be a suitable catalyst carrier for slurry polymerization. For this reason, it is preferred to carry out the above contacting under mild conditions and to precipitate a solid magnesium compound, and it is desirable to consider the contacting temperature, the amount of the alkyl aluminum compound added during the solid precipitation, the speed of adding it, the concentrations of the individual ingredients, etc.

Preferably, the contacting of the liquid magnesium compound with the organoaluminum compound is carried out at a temperature of, for example, −50° to 100° C., preferably −30° to 50° C., and thereafter the reaction is carried out at 0° to 200° C., preferably 40° to 150° C. As already stated hereinabove, it is preferred to employ temperatures of 0° to 250° C., especially 20° to 130° C., when the resulting solid magnesium compound is further reacted with the alkyl aluminum compound under contacting.

In any case, the contacting and reacting conditions may be properly selected so as to meet the conditions specified by the requirement (ii) of the present invention. At the same time, it is preferred to select the contacting and reacting conditions such that the resulting complex has a particle diameter of at least 1 micrometer, especially 5 to 100 micrometers and a particle size distribution, in terms of a geometric standard deviation, of 1.0 to 2.0 and is in the form of granules.

After forming the solid magnesium compound, an organometallic compound of a metal of Groups I to III of the period table excluding aluminum, such as an alkyl lithium, an alkyl magnesium halide or a dialkyl magnesium, may be used instead of the alkylaluminum compound as a compound to be contacted with the solid magnesium compound in order to produce a magnesium aluminum complex.

Another method of producing the magnesium-/aluminum solid complex (A-1) is to use a halogenating agent, such as chlorine, hydrogen chloride, silicon tetrachloride or halogenated hydrocarbons, in any desired step where the alkyl aluminum compound is used. Or the halogenating agent may be used before or after using the alkyl aluminum compound. These methods are also useful as a substitute for the method involving the use of the alkyl aluminum halide.

The use of the halogenating agent before using the alkyl aluminum compound is useful as means for forming a solid magnesium compound containing the group $R^1O$ or a group capable of forming the group $R^1O$ from the liquid magnesium compound. By reacting such a solid magnesium compound with an alkyl aluminum compound, the desired magnesium/aluminum solid complex (A-1) can be produced. For example, the solid magnesium compound may be produced by reacting a solution containing the aforesaid $MgX_2$, $Mg(OR^3)X$ or $Mg(OR^5)_2$ and alcohol, preferably further containing a hydrocarbon, with the halogenating agent, or by reacting a hydrocarbon solution of $Mg(OR)_2$ with the halogenating agent. This solid magnesium compound is represented by the empirical formula $MgX_{2-l}(OR^5)l.n-R^6OH$ (wherein $0 \leq l < 2$, $n \geq 0$, $R^6$ is a hydrocarbon), and sometimes forms a double compound with another compound. In this method, the reaction of the solid magnesium compound and the alkyl aluminum compound in such proportions that the amount of halogen is about 1 to 1000 equivalents per magnesium atom of the magnesium compound can be carried out in accordance with the aforesaid method of the second step in the multiple-step preparation.

Still another method of obtaining the solid magnesium compound is to cool and solidify $MgX_{2-l}(OR^5)l.-R^6OH$ in the molten state, preferably in the molten and dispersed state in a hydrocarbon medium.

In any of the above methods, it is preferred to select precipitating conditions such that the resulting solid magnesium compound has a particle diameter of at least 1 micrometer, especially 5 to 100 micrometers and a particle size distribution, in terms of a geometrical standard deviation, of 1.0 to 2.0, and is spherical or granular.

The titanium catalyst component (A) used in the process of this invention can be obtained as a reaction product of the hydrocarbon-insoluble magnesium-/aluminum solid complex (A-1) derived as shown above from the liquid magnesium compound and the organoaluminum compound [the complex (A-1) contains 0.01 to 0.5 g equivalent, per Mg atom, of the hydrocarbon group $R^2$ having reducing ability and 0.5 to 15 parts by weight, per part by weight of Mg, of the organic group $OR^1$ having no reducibility] with the tetravalent titanium compound (A-2). The solid complex (A-1) and the titanium compound (A-2) are reacted such that the Ti/Mg atomic ratio is in the range of from 0.01 to 0.6, preferably from 0.04 to 0.3 [requirement (iii)].

In the present invention, the solid complex (A-1) and the titanium compound (A-2) are reacted under the conditions which satisfy the requirement (iii). The resulting titanium catalyst component (A) should meet the requirement that it contains 10 to 100%, preferably 40 to 100%, based on the entire Ti in the component, of Ti having a lower valency state than a valence of 4 [requirement (i)].

If the proportion of the tetravalent titanium compound (A-2) is increased beyond the specified limit of the Ti/Mg atomic ratio in requirement (iii), the amount of that portion of the titanium compound which is not effectively used increase. Moreover, when the titanium compound is a halogen-containing titanium compound, the increase of the tetravalent titanium compound (A-2) undesirably decreases the amount of the $OR^1$ group in the resulting titanium catalyst component (A) and reduces the performance of the catalyst. Furthermore, when the titanium compound is a tetraaryloxy titanium or a teraaryloxy titanium, the increase of the tetravalent titanium compound (A-2) undesirably results in dissolution of part or the whole of the solid complex (A-1) in the hydrocarbon solvent.

Preferably, the tetravalent titanium compound (A-2) used in the preparation of the solid titanium catalyst component in the present invention is a tetravalent titanium compound represented by the formula $Ti(OR)_gX_{4-g}$ wherein R is a hydrocarbon group, X is halogen and $0 \leq g \leq 4$. Examples of such a titanium compound include titanium tetrahalides such as $TiCl_4$, $TiBr_4$ and $TiI_4$; alkoxy titanium trihalides such as $Ti(OCH_3)Cl_3$, $Ti(OC_2H_5)Cl_3$, $Ti(O\text{ }n\text{-}C_4H_9)Cl_3$, $Ti(OC_2H_5)Br_3$ and $Ti(O\text{ iso-}C_4H_9)Br_3$; alkoxy titanium dihalides such as $Ti(OCH_3)_2Cl_2$, $Ti(OC_2H_5)_2Cl_2$, $Ti(O\text{ }n\text{-}C_4H_9)_2Cl_2$ and $Ti(OC_2H_5)_2Br_2$; trialkoxy titanium monohalides such as $Ti(OCH_3)_3Cl$, $Ti(OC_2H_5)_3Cl$, $Ti(O\text{ }n\text{-}C_4H_9)_3$ and $Ti(OC_2H_5)_3Br$; and tetraalkoxy titaniums such as $Ti(OCH_3)_4$, $Ti(OC_2H_5)_4$ and $Ti(O\text{ }n\text{-}C_4H_9)_4$. Among these, the titanium tetrahalides and alkoxy titanium trihalides are preferred. The use of alkoxytitanium trihalides is especially preferred.

The contacting reaction of the magnesium/aluminum solid complex (A-1) with the titanium compound is carried out preferably in a hydrocarbon medium. It is advisable to select such conditions in the contacting with the titanium compound, that the weight ratio of the $R^7O$ group/Mg ($R^7$ is a hydrocarbon group) in the final solid titanium catalyst component (A) is in the range of from 0.5 to 15, preferably from 1 to 10, especially preferably from 2 to 6. The $R^7O$ group is derived from the $OR^1$ group in the magnesium-aluminum solid complex (A-1) and the titanium compound. If the amount of the $R^7O$ group is smaller than the above specified limit, slurry polymerizability in the copolymerization of ethylene is poor, and the resulting copolymer does not have sufficiently narrow composition distribution. If the amount of the $R^7O$ group is larger than the above-specified limit, the activity of the resulting catalyst tends to be decreased.

The amount of the $R^7O$ group in the solid titanium catalyst component (A) is adjusted within the aforesaid range by adjusting the type and amount of the titanium compound, the contacting temperature, etc. The contacting temperature of the titanium compound is, for example, about 0° to 200° C., preferably about 20° to 100° C.

In the present invention, the solid complex (A-1) may be formed in the presence of a porous inorganic and/or organic compound. By this procedure, the solid complex (A-1) may be deposited on the surface of such a compound. It is possible at this time to pre-contact the porous compound with the liquid magnesium compound and contact it with a liquid titanium compound while holding the liquid magnesium compound therein. Example of such porous compounds are silica, alumina, magnesia and polyolefins and products of treatment of these compounds with a halogen-containing compound.

One example of the titanium catalyst component so obtained may be represented by the empirical formula $Mg_rAl_sTi_t(OR^7)_uX^1_v$ wherein r, s, t, u and va are more than, 0, and $X^1$ is halogen, and may contain another compound such as a silicon compound. In the titanium catalyst component, the Ti/Mg atomic ratio is, for example, from 0.01 to 0.5, preferably from 0.02 to 0.2; the Al/Mg atomic ratio is, for example, from 0.05 to 1, preferably from 0.08 to 0.5, more preferably from 0.12 to 0.3; the $X^1$Mg atomic ratio is from 1.5 to 3, preferably from 2 to 2.5; the $OR^7$/Mg weight ratio is, for example, from 0.5 to 15, preferably from 1 to 10, especially preferably from 2 to 6; and its specific surface area is, for example, 50 to 1000, preferably 150 to 500 m²/g. 5 to 95% of all Ti atoms are Ti atoms having a lower valency state than a valence of 4. Preferably, the proportion of $Ti^{3+}$ is 5 to 95%, especially 10 to 90%.

The arithmetic mean diameter of the titanium catalyst component (A) is preferably 5 to 100 micrometers, and its particle size distribution, in terms of its geometrical standard deviation in accordance with the measuring method to be described below, is 1.0 to 2.0, preferably 1.0 to 1.5.

In the present invention, ethylene can be copolymerized with an alpha-olefin having 3 to 10 carbon atoms, preferably 4 to 10 carbon atoms, in the presence of a catalyst composed of the titanium catalyst component (A) and the organoaluminum compound catalyst component (B) as in a conventional process except that the titanium catalyst component (A) is obtained as described above and meets the parametric combination of the requirements (i), (ii) and (iii) of the present invention.

The organoaluminum compound catalyst component (B) may be properly selected from the alkyl aluminum compounds exemplified above for use in the preparation of the titanium catalyst component.

Of these, trialkyl aluminums, alkyl aluminum halides, or mixtures of these are preferred. The dialkyl aluminum halides are especially preferred.

Examples of the alpha-olefin having 3 to 10 carbon atoms include propylene, 1-butene, 1-pentene, 1-hexene, 4-methyl-1-pentene, 3-methyl-1-pentene, 1-octene and 1-decene.

In the process of this invention, the copolymerization of ethylene with at least one alpha-olefin having 3 to 10 carbon atoms may be carried out in the liquid or vapor phase in the presence or absence of an inert polymerization solvent which can be used in the polymerization include aliphatic hydrocarbons such as propane, butane, pentane, hexane, octane, decane and kerosene; alicyclic hydrocarbons such as cyclopentane, methylcyclopentane, cyclohexane and methylcyclohexane; and aromatic hydrocarbons such as benzene, toluene, xylene and ethylbenzene. When the ethylene copolymer of this invention is to be produced by employing the slurry polymerization method, it is preferred to use an aliphatic hydrocarbon solvent.

The amounts of the catalyst components can be properly varied and changed. For example, per liter of the volume of the reaction zone, the titanium catalyst component (A) is used in an amount of preferably about 0.0005 to about 1 millimoles, more preferably about 0.001 to about 0.5 millimoles, calculated as titanium atom; and the organoaluminum compound catalyst component (B) is used in such an amount that the aluminum/titanium atomic ratio is, for example, from about 1 to about 2000, preferably from about 5 to about 100. The polymerization temperature may, for example, be about 20° to about 150° C. When the low-density ethylene copolymer in accordance with this invention is to be produced by slurry polymerization or vapor-phase polymerization, the polymerization is preferably carried out at a temperature of 50° to 120° C. The polymerization pressure is, for example, from atmospheric pressure to about 100 Kg/cm$^2$-G, especially about 2 to about 50 kg/cm$^2$-G.

The copolymerization may be performed in the presence of hydrogen for controlling the molecular weight of the copolymer.

The polymerization may be carried out batchwise or continuously, or in two or more steps having different conditions.

The ethylene copolymer in accordance with this invention having a density of 0.910 to 0.945 g/cm$^3$ are obtained usually by copolymerizing ethylene with the alpha-olefin so that the ethylene content of the copolymer becomes 85 to 99.5% although this differs depending upon the type of the alpha-olefin.

BEST MODE OF PRACTICING THE INVENTION

To illustrate the process of this invention further, its embodiments including the best mode of practicing the invention are shown in the following examples.

In the following Examples and Comparative Examples, the compositions, particle diameters, etc. of the catalyst components were measured by the following methods.

(1) Analysis of the compositions of the catalyst components (i) Contents of magnesium, titanium, aluminum and halogen Analyzed by fluorescent X-ray analysis.

(ii) Content of the alkoxy group

The catalyst is dissolved in acetone containing a small amount of hydrochloric acid to hydrolyze the alkoxy group to an alcohol, and the amount of the alcohol in the solution is measured by gas chromatography.

(iii) The proportion of Ti having a lower valency state in the entire Ti supported on the catalyst In an atmosphere of nitrogen, the catalyst was dissolved in a 1N aqueous solution of sulfuric acid, and the proportions of tetravalent Ti and trivalent Ti is measured by polarography (by this method, trivalent Ti and divalent Ti cannot be distinguished from each other).

(iv) Content of the hydrocarbon group R$^2$ having reducibility in the solid complex (A-1)

A flask having an inner capacity of about 1200 ml and equipped with a stirring device is thoroughly purged with dry nitrogen. Then, about 0.5 g of the complex (A-1) is precisely weighed and added to the flask. Subsequently, about 25 ml of water is gradually added dropwise with stirring. This operation is carried out while avoiding leakage of the generated R$^2$-H outside. Twenty minutes after the end of the addition, the gaseous phase and the aqueous phase are withdrawn from the flask by a microsyringe, and the concentration of the generated R$^2$—H is measured by gas chromatography.

The amount of the generated R$^2$—H is calculated from this concentration, the volume of the gaseous phase and the volume of the aqueous phase, and from this amount, the amount of R$^2$ contained in the complex (A-1) is calculated.

(2) Average particle diameter of the catalyst

The catalyst is photographed through an optical microscope. On the basis of the photograph, the particle diameters of about 100 arbitrarily selected catalyst particles are measured. The arithmetic mean of the measured values is calculated and defined as the average particle diameter.

(3) Geometrical standard deviation of the catalyst

Ethylene and 4-methylpentene-1 are copolymerized by the following method (ii) using a sample catalyst. The geometrical standard deviation of the resulting polymer particles is defined as the geometrical standard deviation of the catalyst.

(i) Method of measuring the geometrical standard deviation of the polymer particles The polymer particles are sieved with sieves having mesh sizes of 44 microns, 105 microns, 177 microns, 250 microns, 350 microns and 840 microns, and the weight of the polymer particles left on the individual sieves are measured. Based on the results, the particle diameters are cumulative weight proportions are plotted on the abscissa and the ordinate respectively on logarithmic probability paper to prepare a straight line or curve. By utilizing the prepared line or curve, the particle diameter ($D_{50}$) correspond to 50% by weight and the smaller particle diameter ($D_{16}$) corresponding to 16% by weight are determined, and the value of $D_{50}/D_{16}$ is defined as the geometrical standard deviation.

(ii) Method of polymerization

Purified hexane (850 ml) is charged into a 2-liter autoclave, and the autoclave is purged with ethylene at room temperature. At 60° to 65° C., 1.25 millimoles of diethyl aluminum chloride, 0.025 millimoles of the solid titanium catalyst component calculated as titanium atom, and 150 ml of 4-methylpentene-1 are added. The catalyst charge opening is closed and the autoclave is sealed. The autoclave is pressurized with hydrogen to 1.2 kg/cm$^2$G, and the total pressure is raised to 4 kg/cm$^2$G with ethylene. The polymerization is carried out at 70° C. When the inside temperature of the autoclave is lowered to 55° C., the polymer suspension after the polymerization is taken out, quickly filtered on a filter. The polymer powder is obtained and dried.

The polymerization time is set so that the amount of the polymer powder yielded becomes about 150 to 200 g.

EXAMPLE 1

Preparation of the titanium catalyst (A)

Commercial anhydrous magnesium chloride (4.8 g), 23.1 ml of 2-ethylhexyl alcohol and 200 ml of decane were reacted at 140° C. for 3 hours to obtain a uniform solution containing magnesium chloride. While the solution was stirred, a mixed solution of 7.1 ml of triethyl aluminum and 45 ml of decane at 20° C. was added wise over the course of 30 minutes. Thereafter, the mixture was heated to 80° C. over the course of 2.5 hours, and reacted at 80° C. for 1 hour. After the reaction, the reaction slurry was left to stand. The supernatant was removed, and 200 ml of decane and 6.3 ml (50 millimoles) of diethyl aluminum chloride were added to the remaining slurry containing the solid portion formed by the above reaction. The mixture was reacted at 80° C. for 1 hour. The solid portion was then separated by filtration and washed once with 100 ml of decane to synthesize a solid component (A-1) having a reducible organic group. The composition of the solid component (A-1) is shown in Table 1.

The solid component was suspended in 200 ml of decane, and 4.0 millimoles of 2-ethylhexoxy titanium trichloride (Ti/Mg atomic ratio=0.08) was added, and they were reacted at 80° C. for 1 hour. The reaction mixture was washed with decane to prepare a solid titanium catalyst component.

A portion of the slurry was taken. Decane was removed from it, and replaced by hexane. The slurry was then dried. The composition of the dried catalyst was examined. The composition of the solid titanium catalyst component (A) is shown in Table 2. [Polymerization]

A 2-liter autoclave was charged with 850 ml of purified hexane, and purged with ethylene at room temperature. The temperature was raised, and at 60° to 65° C., 1.25 millimoles of diethyl aluminum chloride, 0.025 millimole, calculated as titanium atom, of the solid titanium catalyst component, and 150 ml of 4-methylpentene-1 were added. The catalyst charge opening was closed and the autoclave was sealed. The autoclave was pressurized with hydrogen, and the total pressure was raised further to 4 kg/cm$^2$G with ethylene. The polymerization was carried out at 70° C. for 2 hours. After the polymerization, the polymer suspension was taken out when the inside temperature of the was lowered to 55° C., and quickly filtered on a filter to separate it into a polymer powder and a hexane-soluble portion. The hexane-soluble portion was concentrated, and the amount of the solvent-soluble polymer formed was measured. The results of the polymerization are shown in Table 3. The particle size distribution of the polymer powder was as follows:

| >840 microns | 0 |
| >350 microns | 0.4 |
| >250 microns | 94.0 |
| >177 microns | 5.4 |
| >105 microns | 0.2 |
| >44 microns | 0 |
| 44 microns> | 0 |

EXAMPLE 2-6

Ethylene and 4-methylpentene-1 were copolymerized in the same way as in Example 1 except that the following organometallic compounds in the amounts indicated were used instead of 6.3 ml (50 millimoles) of diethyl aluminum chloride in the synthesis of the solid component (A-1). The results are shown in Table 3.

| Example 2 | Et$_{1.5}$AlCl$_{1.5}$ | 50 |
| Example 3 | n-Bu$_3$Al | 65 |
| Example 4 | iso-Bu$_3$Al | 70 |
| Example 5 | n-Hex$_3$Al | 70 |
| Example 6 | EtMgBu | 70 |

EXAMPLE 7

Commercial anhydrous magnesium chloride (4.8 g), 23.1 ml of 2-ethylhexyl alcohol and 200 ml of decane were reacted at 140° C. for 3 hours to give a uniform solution containing magnesium chloride. A mixed solution of 7.1 ml of triethyl aluminum and 45 ml of decane at 20° C. was added dropwise to the solution with stirring over the course of 30 minutes. The temperature was then raised to 80° C. over the course of 2.5 hours and reacted at 80° C. for 1 hour. After the reaction, the reaction slurry was left to stand and the supernatant was removed. Decane (200 ml) and 8.9 ml of triethyl aluminum were added to the remaining slurry containing the solid portion formed by the above reaction, and the reaction was further carried out at 80° C. for 1 hour. The solid portion was then separated and washed once with 100 ml of decane to synthesize a solid component (A-1) having a reducible organic group. The composition of the solid component is shown in Table 1.

The resulting solid component was again suspended in 200 ml of decane, and 0.44 ml (4.0 millimoles) of titanium tetrachloride (Ti/Mg atomic ratio=0.08) was added, and reacted at room temperature for 1 hour to give a decane suspension containing the solid titanium catalyst component. The solid titanium catalyst component (A) was analyzed, and the results are shown in Table 2.

Polymerization

The polymerization was carried out in the same way as in Example 1. The results are shown in Table 3.

EXAMPLES 8-18

A solid titanium catalyst component was prepared by the method of Example 7 except that 0.44 ml of titanium tetrachloride was replaced by each of the following titanium compounds (the amount was the same as in Example 7). Using the solid titanium catalyst component, the same polymerization as in Example 1 was carried out. The results are shown in Table 3.

| Example | Titanium compound |
|---|---|
| 8 | Ti(OEt)$_4$ |
| 9 | Ti(O isopr)$_4$ |
| 10 | Ti(OBu)$_4$ |
| 11 | Ti(OEH)$_4$ |
| 12 | Ti(OBu)$_4$ dimer |
| 13 | Ti(OBu)$_4$ tetramer |
| 14 | Ti(OBu)$_2$Cl$_2$ |
| 15 | Ti(OEH)$_2$Cl$_2$ |
| 16 | Ti(OEt)Cl$_3$ |
| 17 | Ti(OBu)Cl$_3$ |
| 18 | Ti(OEH)Cl$_3$ |

EXAMPLE 19

A solid titanium catalyst component was prepared by the same method as in Example 1 except that the method of preparing the liquid magnesium compound in Example 1 was changed as follows. Specifically, 23.1 ml of 2-ethylhexanol was added to 200 ml of a decane suspension containing 50 millimoles of ethoxy magnesium chloride, and the mixture was reacted with stirring at 140° C. for 3 hours to synthesize a uniform solution containing magnesium. Using the resulting solid titanium catalyst component, the same polymerization as in Example 1 was carried out.

EXAMPLE 20

A solid titanium catalyst component was prepared in the same way as in Example 1 using 57 ml of a decane solution containing 50 millimoles of 2-ethylhexoxy magnesium. Using the resulting catalyst component, the same polymerization as in Example 1 was carried out.

EXAMPLE 21

Commercial anhydrous magnesium chloride (4.8 g), 23.1 ml of 2-ethylhexyl alcohol and 200 ml of decane were reacted at 140° C. for 3 hours to give a uniform solution containing magnesium chloride. Silicon tetrachloride (8.6 ml) was added to this solution at 20° with stirring. The mixture was heated to 50° C., and reacted at this temperature for 5 hours to form a solid containing 42% by weight of 2-ethylhexanol. After the reaction, the solid was separated by filtration, and suspended in 100 ml of decane. Triethyl aluminum (8.6 ml) was added, and the reaction as carried out at 80° C. for 1 hour. The solid portion was separated by filtration, and suspended in 200 ml of decane. A decane solution of titanium ethoxy trichloride was added in an amount of 4 millimoles calculated as titanium atom, and the mixture was stirred at room temperature for 1 hour to form a decane suspension of a solid titanium catalyst component. Using this catalyst component, the same polymerization as in Example 1 was carried out. The results of the polymerization are shown in Table 3.

EXAMPLE 22

A 2-liter high-speed stirring device (made by Tokushu Kika Kogyo) was fully purged with $N_2$ and charged with 700 ml of purified kerosene, 10 g of commercial $MgCl_2$, 24.2 g of ethanol and 3 g of Emasol 320 (a trade name for sorbitan distearate produced by Kao-Atlas Co., Ltd.). The mixture was heated with stirring, and stirred for 30 minutes at 120° C. and 800 rpm. With stirring at high speed, the mixture was transferred by means of a Teflon tube having an inside diameter of 5 mm to a 2-liter glass flask (equipped with a stirrer) in which 1 liter of purified kerosene cooled to $-10°$ C. had been placed. The resulting solid was collected by filtration, and fully washed with hexane to obtain a carrier.

Ten grams of the carrier (containing 43 millimoles of magnesium) was suspended in 100 ml of decane, and while the suspension was maintained at $-10°$ C., 87 ml of diethyl aluminum chloride diluted with decane to 1 mole/liter was added dropwise over the course of 1 hour. The mixture was heated to 80° C. over the course of 2 hours, and reacted at this temperature for 2 hours. The solid portion was separated, and suspended in 100 ml of decane. Titanium tetrachloride (0.43 ml; Ti/Mg atomic ratio=0.09) was added, and the reaction was carried out at 80° C. for 1 hour to prepare a solid titanium catalyst component. The same polymerization as in Example 1 was carried out using the resulting catalyst component. The results of the polymerization are shown in Table 3.

EXAMPLE 23

A 2-liter fully purged autoclave was charged with 1 liter of purified hexane, 1.25 millimoles of diethyl aluminum chloride, and then 0.025 millimole, calculated as titanium atom, of the solid titanium catalyst component prepared in Example 1. Hydrogen under 1.0 kg/cm² was introduced into the autoclave, and the temperature was raised to 70° C. A gaseous mixture of ethylene and butene-1 with a butene-1 content of 18.0 mole % was fed into the autoclave and polymerized at 70° C. under a total pressure of 3.5 kg/cm²G for 2 hours. There was obtained 245.5 g of a polymer powder having an apparent bulk density of 0.38 g/ml, an MFR of 1.1 dg/min. and a density of 0.926 g/ml. There was also formed 2.7 g of a hexane-soluble polymer. Accordingly, the polymerization activity was 9,900 g-PE/mmole-Ti and the yield was 98.9% by weight. The proportion of the hexane-soluble portion was 1.1% by weight.

COMPARATIVE EXAMPLE 1

A solid titanium catalyst component was prepared by the same method as described in Example 1 of Japanese Patent Publication No. 19122/1982 (corresponding to British Patent No. 1,485,520). Specifically, 19.0 g of anhydrous magnesium chloride powder was suspended in 200 ml of kerosene, and 70.1 ml of ethanol was added. They were mixed with stirring for 1 hour. Then, 70.4 ml of diethyl aluminum chloride was added dropwise over 30 minutes using a dropping funnel and mixed at 20° C. for 1 hour. Then, 13.2 ml of titanium tetrachloride and 16.4 ml of triethyl aluminum were added and mixed with stirring at room temperature for 4 hours to obtain a kerosene suspension of a solid titanium catalyst component. This catalyst component had a geometrical standard deviation of 1.6.

The same polymerization as in Example 1 was carried out using the resulting solid titanium catalyst component.

The results are shown in Tables 4 and 5.

COMPARATIVE EXAMPLE 2

A solid titanium catalyst component was prepared by the same method as described in Example 10 of Japanese Patent Publication No. 32270/1975 (corresponding to British Patent No. 1,433,537). Specifically, 19.0 g of anhydrous magnesium chloride was suspended in 800 ml of kerosene, and 0.1 ml of ethanol was added with stirring. The reaction was carried out at room temperature for 1 hour. Then, 73.0 ml of ethyl aluminum sesquichloride was added dropwise and mixed for 1 hour. Titanium tetrachloride (100 ml) was added dropwise, and with stirring, the mixture was heated to 100° C. with stirring, and reacted at this temperature for 3 hours. The solid portion was separated by decantation, and suspended in kerosene to obtain a kerosene suspension of a solid titanium catalyst component. This catalyst component had a geometrical standard deviation of 1.6.

The same polymerization as in Example 1 was carried out.

The results are shown in Tables 4 and 5.

EXAMPLE 24

A 1-liter glass flask was charged with 500 ml of n-decane, and the temperature was raised to 95° C. while a gaseous mixture of propylene and ethylene (in a mole ratio of 60:40) was passed through the liquid phase in the flask at a flow rate of 100 liters/hour. Then, 1.0 millimole of diethyl aluminum chloride and 0.05 millimole, calculated as titanium atom, of the solid titanium catalyst component prepared in Example 1 were added, and propylene and ethylene were copolymerized at 100° C. for 50 minutes. During the polymerization, the gaseous mixture of the above composition was passed through the liquid phase in the flask at a constant rate of 200 liters/hour. After the lapse of a predetermined period of time, about 5 ml of butyl alcohol was added dropwise to stop the polymerization. The polymer solution was added to 4 liters of methanol with stirring to precipitate the resulting polymer. The polymer so obtained was dried fully. Its amount was 53.8 g, and it was a copolymer containing 63 mole % of propylene.

IR measurement hardly revealed chains consisting of 5 or more methylene radicals, and this suggests that the copolymer obtained has a narrow composition distribution.

COMPARATIVE EXAMPLES 3-4

Titanium catalyst components were prepared in accordance with the methods of Examples 1 and 2 of Japanese Laid-Open Patent Publication No. 11908/1981. These catalyst components had the following compositions.

|  | Comparative Example | |
|---|---|---|
|  | 3 | 4 |
| Ti/Mg atomic ratio | 0.1 | 0.09 |
| Al/Mg atomic ratio | 0.06 | 0 |
| X/Mg atomic ratio | 2.5 | 2.4 |
| OR$^1$/Mg weight ratio | 0.08 | 0.06 |

In addition to these components, the catalyst component contained 10.2% (Comparative Example 3) or 11.0% (Comparative Example 4) of ethyl benzoate. OR$^1$ is 2-ethylhexoxy.

The same polymerization as in Example 1 was carried out using each of these titanium catalyst components. The results are shown below.

|  | Comparative Example | |
|---|---|---|
|  | 3 | 4 |
| g-PE/mmole-Ti | 6,100 | 5,700 |
| Yield (wt. %) | 81.6 | 74.6 |
| Proportion of the hexane-soluble portion (wt. %) | 18.4 | 25.5 |
| MFR (dg/min.) | 1.4 | 1.8 |
| Density (g/ml) | 0.932 | 0.933 |
| Bulk density (g/ml) | 0.26 | 0.24 |

It is seen that the proportion of the hexane-soluble portion was very great, and the polymer obtained had a low bulk density.

COMPARATIVE EXAMPLE 5

The procedure up to the treatment with ethyl aluminum (reaction at 80° C. for 1 hour) in Example 1, [Preparation of a titanium catalyst (A)] was carried out. The resulting slurry was filtered to separate the solid portion. The solid portion was washed once with 200 ml of hexane, and suspended in 100 ml of decane. Then, 100 millimoles of 2-ethylhexoxy titanium trichloride (Ti/Mg atomic ratio=2) was added, and reacted at 80° C. for 1 hour. The reaction product was washed and otherwise worked up in the same way as in Example 1.

The resulting titanium catalyst component had the following composition (% by weight).
Ti: 2.8
Cl: 55
Mg: 17
Al: 1
OR$^1$: 24.3
PR$^1$/Mg weight ratio: 1.4
Al/Mg atomic ratio: 0.05
(OR$^1$: 2-ethylhexoxy group)

Ethylene and 4-methylpentene-1 were copolymerized in the same way as in Example 1 using the resulting titanium catalyst component. The results were as follows:
g-PR/mmole-Ti: 12,800
Yield (%): 80.7
Proportion of the hexane-soluble portion (%): 19.3
MFR (dg/min.): 5.3
Density (g/l): 0.934
Bulk density g/ml): 0.26

It is seen that the proportion of the hexane-soluble portion was large, and the polymer had a low bulk density.

TABLE 1

| | Composition of (A-1) | | | |
|---|---|---|---|---|
| Example No. | Al/Mg (atomic ratio) | OR$^1$/Mg (weight ratio) | Cl/Mg (atomic ratio) | R$^2$/Mg (g-equivalent per Mg atom) |
| 1 | 0.26 | 5.1 | 2.3 | 0.07 |
| 2 | 0.21 | 5.0 | 2.3 | 0.07 |
| 3 | 0.28 | 7.0 | 2.5 | 0.07 |
| 4 | 0.22 | 4.8 | 2.3 | 0.08 |
| 5 | 0.30 | 6.5 | 2.3 | 0.06 |
| 6 | 0.27 | 4.1 | 2.1 | 0.08 |
| 7-18 | 0.18 | 3.6 | 2.2 | 0.09 |

TABLE 2

| | Composition, particle diameter, etc. of the solid Ti catalyst (A) | | | | | | |
|---|---|---|---|---|---|---|---|
| Example No. | Ti/Mg (atomic ratio) | Cl/Mg (atomic ratio) | Al/Mg (atomic ratio) | (1) OR$^1$/Mg (weight ratio) | (2) Ti$^x$/total Ti (%) | Average particle diameter (m) | Geometrical standard deviation |
| 1 | 0.04 | 2.0 | 0.19 | 3.0 | 100 | 21 | 1.1 |
| 2 | 0.05 | 1.0 | 0.16 | 3.1 | 95 | 19 | 1.2 |
| 3 | 0.09 | 1.0 | 0.28 | 5.4 | 95 | 18 | 1.2 |
| 4 | 0.08 | 1.0 | 0.17 | 3.2 | 80 | 23 | 1.3 |
| 5 | 0.08 | 2.1 | 0.23 | 4.5 | 80 | 19 | 1.3 |
| 6 | 0.04 | 1.0 | 0.22 | 3.3 | 95 | 21 | 1.1 |
| 7 | 0.08 | 2.1 | 0.10 | 2.3 | 85 | 18 | 1.2 |
| 8 | 0.08 | 1.6 | 0.07 | 1.9 | 75 | 21 | 1.2 |
| 9 | 0.08 | 1.7 | 0.08 | 2.2 | 75 | 22 | 1.1 |
| 10 | 0.09 | 1.0 | 0.08 | 2.1 | 70 | 19 | 1.2 |
| 11 | 0.05 | 1.8 | 0.07 | 3.0 | 70 | 21 | 1.2 |
| 12 | 0.08 | 1.0 | 0.10 | 2.4 | 75 | 21 | 1.2 |
| 13 | 0.08 | 1.0 | 0.11 | 2.5 | 75 | 21 | 1.3 |
| 14 | 0.08 | 1.7 | 0.08 | 2.1 | 80 | 22 | 1.2 |
| 15 | 0.07 | 1.7 | 0.07 | 2.7 | 75 | 21 | 1.2 |
| 16 | 0.08 | 1.9 | 0.08 | 2.0 | 70 | 17 | 1.2 |
| 15 | 0.05 | 1.9 | 0.09 | 2.1 | 75 | 19 | 1.1 |

TABLE 2-continued

Composition, particle diameter, etc. of the solid Ti catalyst (A)

| Example No. | Ti/Mg (atomic ratio) | Cl/Mg (atomic ratio) | Al/Mg (atomic ratio) | (1) OR$^1$/Mg (weight ratio) | (2) Ti$^x$/total Ti (%) | Average particle diameter (m) | Geometrical standard deviation |
|---|---|---|---|---|---|---|---|
| 18 | 0.08 | 1.8 | 0.10 | 2.6 | 85 | 21 | 1.2 |

(1) OR$^1$: 2-Ethylhexoxy group
Ti$^x$: Ti in a lower valency state than a valence of 4

TABLE 3

Results of polymerization

| Example No. | g-PE mmol-Ti | Yield (wt %) | Proportion of the hexane-soluble portion (wt %) | MFR (dg/min) | Density (g/ml) | Bulk density (g/ml) |
|---|---|---|---|---|---|---|
| 1 | 8,600 | 94.4 | 5.6 | 1.4 | 0.925 | 0.37 |
| 2 | 8,700 | 96.3 | 3.7 | 0.5 | 0.928 | 0.34 |
| 3 | 5,600 | 95.0 | 5.0 | 1.7 | 0.931 | 0.34 |
| 4 | 6,400 | 96.8 | 3.2 | 1.7 | 0.932 | 0.34 |
| 5 | 10,200 | 96.4 | 3.6 | 1.0 | 0.930 | 0.35 |
| 6 | 6,400 | 95.5 | 4.5 | 0.5 | 0.929 | 0.36 |
| 7 | 7,000 | 95.4 | 4.6 | 1.3 | 0.932 | 0.34 |
| 8 | 10,500 | 95.7 | 4.3 | 1.7 | 0.933 | 0.35 |
| 9 | 4,600 | 96.8 | 3.2 | 1.5 | 0.935 | 0.37 |
| 10 | 9,500 | 96.4 | 3.6 | 2.7 | 0.936 | 0.37 |
| 11 | 6,100 | 96.9 | 3.1 | 1.0 | 0.936 | 0.34 |
| 12 | 8,200 | 95.0 | 5.0 | 2.2 | 0.934 | 0.35 |
| 13 | 5,800 | 95.1 | 4.9 | 2.5 | 0.935 | 0.36 |
| 14 | 6,700 | 95.1 | 4.9 | 1.4 | 0.933 | 0.37 |
| 15 | 7,400 | 95.1 | 4.9 | 2.0 | 0.934 | 0.37 |
| 16 | 6,600 | 95.6 | 4.4 | 1.4 | 0.932 | 0.36 |
| 17 | 5,800 | 95.2 | 4.8 | 1.8 | 0.932 | 0.36 |
| 18 | 7,800 | 95.1 | 4.9 | 1.5 | 0.931 | 0.35 |
| 19 | 5,700 | 94.6 | 5.4 | 0.7 | 0.935 | 0.34 |
| 20 | 6,100 | 94.2 | 5.8 | 0.7 | 0.933 | 0.33 |
| 21 | 9,600 | 92.1 | 7.9 | 0.8 | 0.931 | 0.36 |
| 22 | 10,300 | 91.0 | 9.0 | 0.7 | 0.931 | 0.34 |

TABLE 4

| Comparative Example | Catalyst composition (wt %) | | | | | Polymerization results | | | | |
|---|---|---|---|---|---|---|---|---|---|---|
| | Ti | Cl | Mg | Al | Alkoxy group | g-PE mmol-Ti | Yield (wt %) | Proportion of the hexane-insoluble portion (wt %) | MFR (dg/min) | Density (g/ml) | Bulk density (g/ml) |
| 1 | 1.7 | 55 | 14 | 2.5 | 15 | 5,200 | 86.7 | 13.3 | 1.2 | 0.933 | 0.14 |
| 2 | 6.8 | 60 | 15 | 2.8 | 13 | 3,000 | 84.5 | 15.5 | 0.6 | 0.931 | 0.12 |

TABLE 5

| Comparative Example | Particle size distribution | | | | | | |
|---|---|---|---|---|---|---|---|
| | >840μ | >350μ | >250μ | >177μ | >105μ | >44μ | 44μ> |
| 1 | 0.3 | 1.2 | 1.6 | 2.3 | 42.3 | 48.2 | 4.1 |
| 2 | 0.5 | 1.2 | 1.2 | 2.1 | 35.2 | 52.6 | 7.2 |

Industrial Utilizability

The process of this invention is suitable for advantageously producing a low to medium density ethylene copolymer of high quality having a density of 0.910 to 0.945 g/cm² from a major proportion of ethylene and a minor proportion of an alpha-olefin having 3 to 10 carbon atoms with high catalytic activity and high productivity per polymerization vessel by an indusrially easy operation.

What is claimed is:

1. A process for preparing a catalyst for copolymerizing ethylene with at least one alphaolefin having 3 to 10 carbon atoms, which comprises
   (1) reacting a solid complex (A-1) and a tetravalent titanium compound (A-2) under such conditions that the Ti/Mg atomic ratio of (A-1) and (A-2) is from 0.01 to 0.6 to form a titanium catalyst component (A), said solid complex (A-1) being (i) a hydrocarbon solvent-insoluble magnesium/aluminum solid complex derived from a liquid magnesium compound and selected from the group consisting of magnesium dihalides, alkoxy magnesium halides, aryloxy magnesium halides, dialkoxy magnesiums, diaryloxy magnesiums and magnesium salts of carboxylic acids, and an oganoaluminum compound, and (ii) containing 0.01 to 0.5 g-equivalent, per Mg g-atom, of a hydrocarbon group R² having reducibility and 0.5 to 15 parts by weight, per part by weight of Mg, of an organic group OR¹ (where R¹ represents a hydrocarbon group) having no reducibility, and said solid complex (A) containing 10 to 100%, based on the entire Ti in the component, of Ti of a lower valency state than a valence of 4, and having a halogen/Mg atomic ratio of from 1.5 to below 3, and (2) combining the titanium catalyst component (A) with an organoaluminum compound catalyst component (B) to form a catalyst.

2. The process of claim 1 wherein the solid complex (A-1) has an Al/Mg atomic ratio of from 0.05 to 1.

3. The process of claim 1 wherein the titanium catalyst component (A) has a Ti/Mg atomic ratio from 0.01 to 0.5, an Al/Mg atomic ratio of from 0.05 to 1, and a weight ratio of the organic group $OR^7$ (wherein $R^7$ is a hydrocarbon group) having no reducibility to Mg of from 0.5 to 15.

4. The process of claim 1 wherein the titanium catalyst component (A) is formed by reacting the solid complex (A-1) with the tetravalent titanium compound (A-2) in the presence of a hydrocarbon solvent.

5. The process of claim 1 wherein the titanium catalyst component (A) contains 40 to 100%, based on the entire Ti in the component, of Ti of a lower valency state than a valence of 4.

6. The process of claim 1 wherein the liquid magnesium compound is a melt of a complex of a magnesium halide with an electron donor represented by $MgX_2 \cdot nR^1OH$, wherein $R^1$ is a hydrocarbon group and n is a positive number.

7. The process of claim 1 wherein the hydrocarbon group $R^2$ is selected from the group consisting of linear or branched alkyl groups having 1 to 10 carbon atoms, aryl groups having 6 to 10 carbon atoms and unsaturated cyclic groups having 5 to 10 carbon atoms.

8. The process of claim 1 wherein the hydrocarbon group $R^1$ of organic group $OR^1$ is selected from the group consisting of linear or branched alkyl groups having 1 to 20 carbon atoms, alkenyl groups having 6 to 20 carbon atoms, aryl groups having 8 to 20 carbon atoms and cyclopentadienyl.

9. The process of claim 1 wherein the tetravalent titanium compound (A-2) is a compound represented by the formula $Ti(OR)_gX_{4-g}$ wherein R is a hydrocarbon group, X is a halogen and $0 \geq g \geq 4$.

10. The process according to claim 9 wherein the tetravalent titanium compound is selected from the group consisting of titanium tetrahalides, alkoxy titanium trihalides, alkoxy titanium dihalides, trialkoxy titanium monohalides and tetraalkoxy titaniums.

11. The process according to claim 1 wherein the magnesium compound is selected from the group consisting of $C_1$ to $C_{20}$ alkoxy magnesium halides, $C_6$ to $C_{30}$ aryloxy magnesiums halides, $C_1$ to $C_{20}$ alkoxy magnesiums and $C_6$ to $C_{30}$ aryloxy magnesiums.

12. The process of claim 1 wherein said titanium catalyst component (A) is represented by the empirical formula

wherein $X^1$ represents a halogen, $R^7$ represents a hydrocarbon, and r, s, t, u and v are positive numbers such that the Ti/Mg atomic ratio is from 0.01 to 0.5, the Al/Mg atomic ratio is from 0.05 to 1, the $X^1$/Mg ratio is from 1.5 to about 2.5, and the $OR^7Mg$ weight ratio is from 0.5 to 15.

13. The process of claim 1 wherein the liquid magnesium compound is a solution of a magnesium compound in a hydrocarbon solvent, an electron donor, or a mixture thereof.

* * * * *